United States Patent
Song et al.

(10) Patent No.: US 10,353,102 B2
(45) Date of Patent: Jul. 16, 2019

(54) ACTIVE DAMPENING FOR WELLBORE LOGGING USING VIBRATION FEEDBACK

(71) Applicant: Halliburton Energy Services, Inc., Houston, TX (US)

(72) Inventors: Xingyong Song, Houston, TX (US); Yiming Zhao, Katy, TX (US); Jason D. Dykstra, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 50 days.

(21) Appl. No.: 15/323,930

(22) PCT Filed: Aug. 7, 2014

(86) PCT No.: PCT/US2014/050156
§ 371 (c)(1),
(2) Date: Jan. 4, 2017

(87) PCT Pub. No.: WO2016/022129
PCT Pub. Date: Feb. 11, 2016

(65) Prior Publication Data
US 2017/0146677 A1    May 25, 2017

(51) Int. Cl.
*G01V 1/46*   (2006.01)
*G01V 1/52*   (2006.01)
(Continued)

(52) U.S. Cl.
CPC ............... *G01V 1/523* (2013.01); *E21B 49/00* (2013.01); *E21B 49/08* (2013.01); *G01V 1/46* (2013.01); *E21B 47/18* (2013.01)

(58) Field of Classification Search
CPC .......... G01V 1/523; G01V 1/46; E21B 49/00; E21B 49/08; E21B 47/18
(Continued)

(56) References Cited

U.S. PATENT DOCUMENTS

| | | | |
|---|---|---|---|
| 4,743,821 A * | 5/1988 | Hall | B41J 9/50 101/93 |
| 5,216,638 A | 6/1993 | Wright | |

(Continued)

FOREIGN PATENT DOCUMENTS

| | | |
|---|---|---|
| WO | 03/071097 A1 | 8/2003 |
| WO | 2012034071 A1 | 3/2012 |

OTHER PUBLICATIONS

Extended European Search Report issued in related EP application No. 14899233.2, dated Feb. 21, 2018, 7 pages.
(Continued)

*Primary Examiner* — Daniel L Murphy
(74) *Attorney, Agent, or Firm* — Benjamin Fite; Baker Botts L.L.P.

(57) ABSTRACT

In accordance with some embodiments of the present disclosure a method of vibration control for a wellbore logging tool is disclosed. The method may include estimating one or more of an estimated position, an estimated velocity, and an estimated acceleration of the wellbore logging tool after the drive signal has been sent to the wellbore logging tool. The method may include generating an active dampening braking signal based, at least in part, on one or more of the estimated position, the estimated velocity, and the estimated acceleration of the wellbore logging tool.

22 Claims, 9 Drawing Sheets

(51) Int. Cl.
*E21B 49/00* (2006.01)
*E21B 49/08* (2006.01)
*E21B 47/18* (2012.01)

(58) Field of Classification Search
USPC .......................................................... 367/33
See application file for complete search history.

(56) References Cited

U.S. PATENT DOCUMENTS

| | | |
|---|---|---|
| 6,671,224 B1 | 12/2003 | Pabon |
| 6,837,332 B1 | 1/2005 | Rodney |
| 7,639,562 B2 | 12/2009 | Patterson et al. |
| 8,687,465 B2 * | 4/2014 | Kamata .................. G01V 1/164 367/185 |
| 2006/0106541 A1 | 5/2006 | Hassan et al. |
| 2009/0005995 A1 | 1/2009 | Tang et al. |
| 2010/0097887 A1 | 4/2010 | Patterson et al. |
| 2014/0192618 A1 | 7/2014 | Pabon et al. |

OTHER PUBLICATIONS

International Search Report and Written Opinion issued in related PCT/US2014/050156 dated May 7, 2015, 15 pages.
International Preliminary Report on Patentability issued in related Application No. PCT/US2014/050156, dated Feb. 16, 2017 (7 pages).

* cited by examiner

ACTIVE DAMPENING FOR WELLBORE LOGGING USING VIBRATION FEEDBACK

CROSS-REFERENCE TO RELATED APPLICATION

The present application is a U.S. National Stage Application of International Application No. PCT/US2014/050156 filed Aug. 7, 2014, which is incorporated herein by reference in its entirety for all purposes.

TECHNICAL FIELD

The present disclosure relates generally to well drilling and hydrocarbon recovery operations and, more particularly, to a system and method of vibration control for a wellbore logging tool.

BACKGROUND

Hydrocarbons, such as oil and gas, are commonly obtained from subterranean formations that may be located onshore or offshore. The development of subterranean operations and the processes involved in removing hydrocarbons from a subterranean formation typically involve a number of different steps such as, for example, drilling a wellbore at a desired well site, treating the wellbore to optimize production of hydrocarbons, and performing the necessary steps to produce and process the hydrocarbons from the subterranean formation.

When performing subterranean operations, it is often desirable to obtain information about the subterranean formation. One method of obtaining information about the formation is the use of a sonic well logging tool. A sonic well logging tool may emit an acoustic signal, which propagates through the formation to at least one receiver. The travel time of the acoustic signal from the tool to the receiver may be used to calculate the speed of the acoustic tone through the formation. Properties of the formation may be determined by comparing the speed of the acoustic tone to the speed of sound through various types of rock and fluid that may be encountered in subterranean operations.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
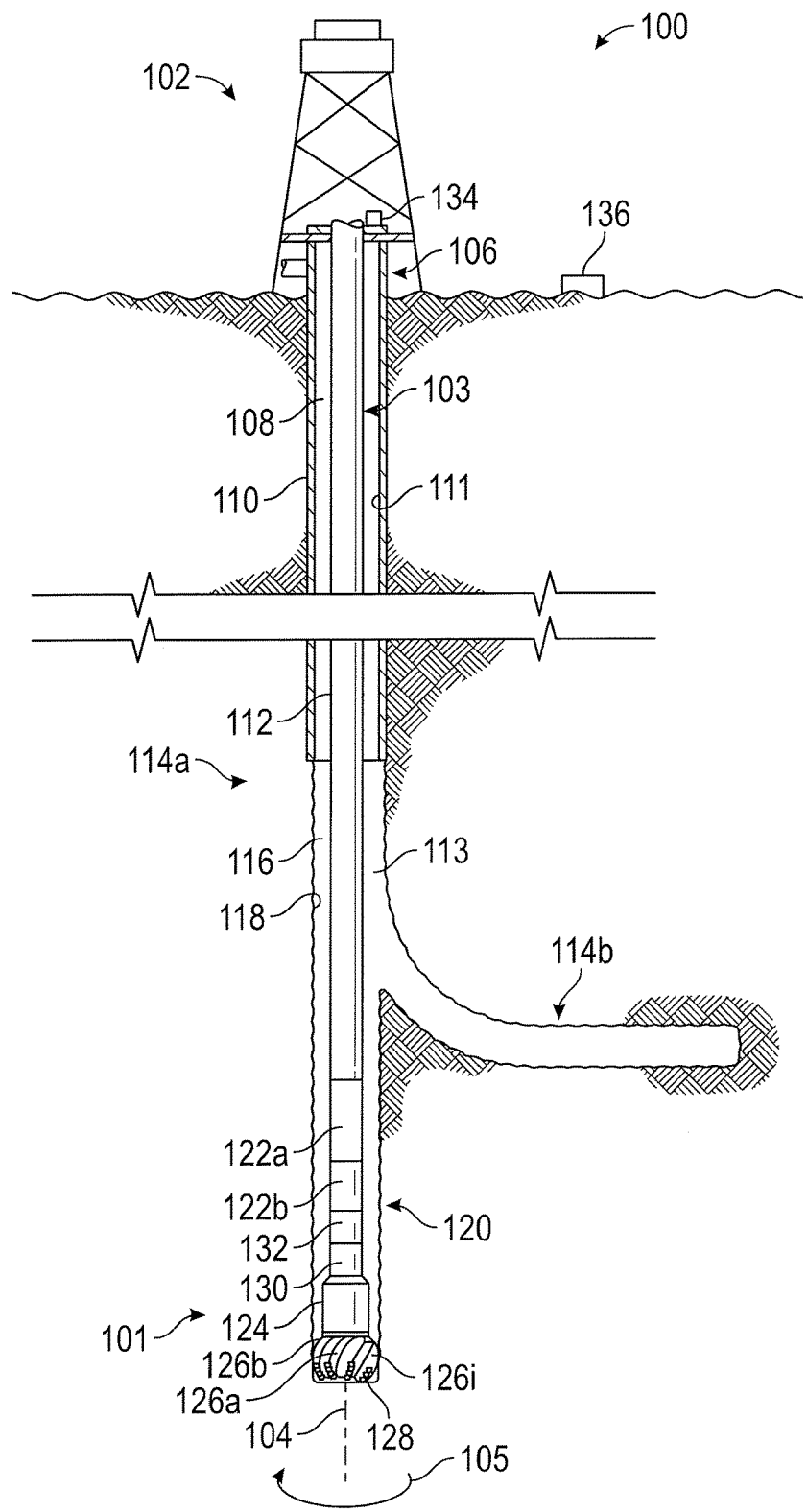
FIG. 1 illustrates an elevation view of an example embodiment of a drilling system used in an illustrative logging-while-drilling (LWD) environment, in accordance with some embodiments of the present disclosure.
Figure 2:
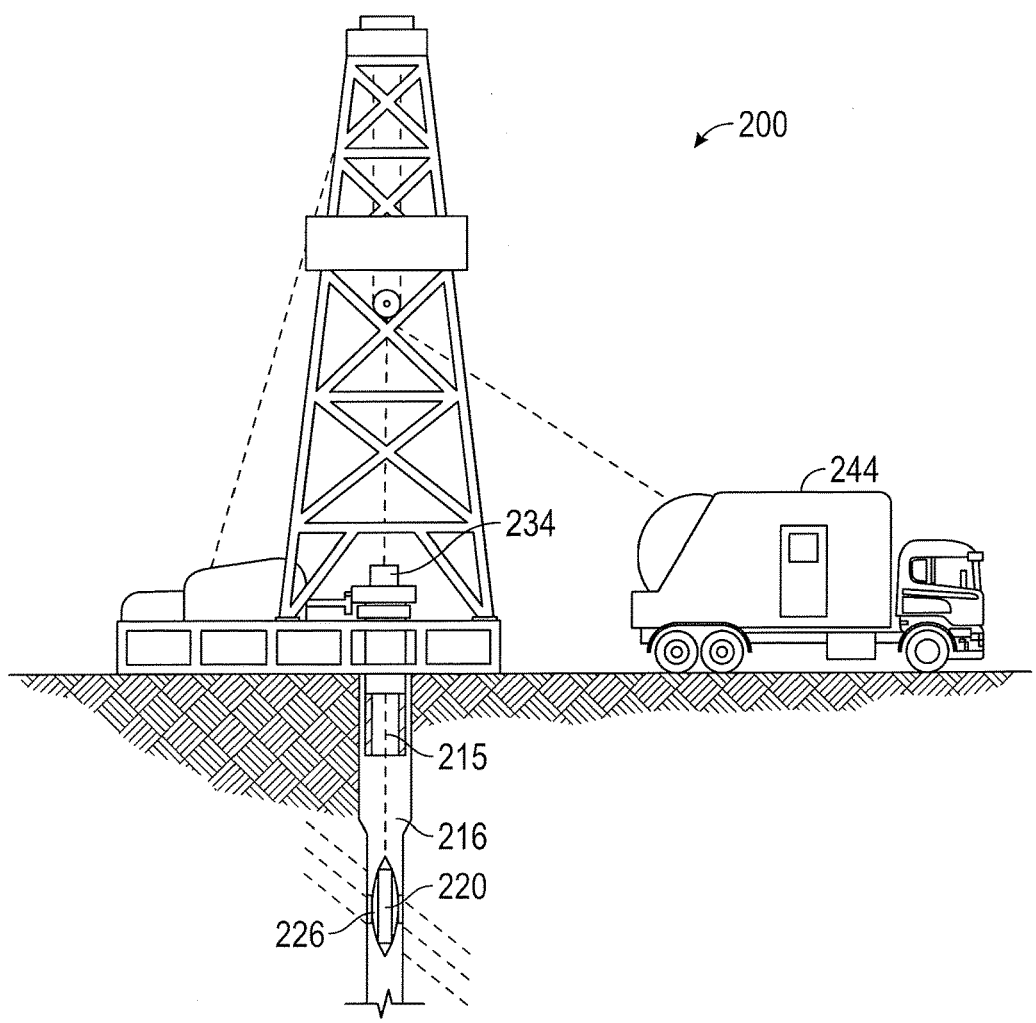
FIG. 2 illustrates an elevation view of an example embodiment of a downhole system used in an illustrative logging environment with the drill string removed, in accordance with some embodiments of the present disclosure.

The present disclosure describes an automated control system and method to optimize vibration control in a wellbore logging tool. The wellbore logging tool may be located on a drill string, as shown in FIG. 1, or on a wireline, as shown in FIG. 2. The wellbore logging tool may be any suitable type of wellbore logging tool, including a sonic logging tool that emits a signal in the form of an acoustic waveform. In some embodiments, components of the sonic logging tool, such as a transmitter or an actuator, may vibrate due to excitations during the process of generating the acoustic signal. The vibration of the components of the sonic logging tool, also known as "ringing," may be in the frequency range of the emitted acoustic signal. The ringing may result in lower quality data, may increase the time required to perform the logging, and may require more energy input into the logging tool. Accordingly, a system and method may be designed in accordance with the teachings of the present disclosure to reduce the ringing of the logging tool components and improve the quality of the acoustic signal emitted by the sonic logging tool, reduce the time and cost of performing wellbore logging, and reduce the total energy input requirements for the logging tool. To improve the efficiency of a subterranean operation, it may be desirable to avoid or to reduce the ringing in an acoustic transmitter that is part of the wellbore logging tool of FIG. 1 or FIG. 2. Although the automated control system and method described herein are directed to vibration control in a sonic logging tool, the vibration control system and method may be adapted to optimize other aspects of a subterranean operation including other types of wellbore logging tools. Embodiments of the present disclosure and its advantages are best understood by referring to FIGS. 1 through 8, where like numbers are used to indicate like and corresponding parts.

FIG. 1 illustrates an elevation view of an example embodiment of drilling system 100 used in an illustrative logging-while-drilling (LWD) environment, in accordance with some embodiments of the present disclosure. Modern petroleum drilling and production operations use information relating to parameters and conditions downhole. Several methods exist for collecting downhole information during subterranean operations, including LWD and wireline logging. In LWD, data is typically collected during a drilling process, thereby avoiding any need to remove the drilling assembly to insert a wireline logging tool. LWD consequently allows an operator of a drilling system to make accurate real-time modifications or corrections to optimize performance while minimizing down time. In wireline logging, a logging tool may be suspended in the wellbore from a wireline and the logging tool may take measurements of the wellbore and subterranean formation.

Drilling system 100 may include well surface or well site 106. Various types of drilling equipment such as a rotary table, drilling fluid pumps and drilling fluid tanks (not expressly shown) may be located at well surface or well site 106. For example, well site 106 may include drilling rig 102 that may have various characteristics and features associated with a "land drilling rig." However, downhole drilling tools incorporating teachings of the present disclosure may be satisfactorily used with drilling equipment located on offshore platforms, drill ships, semi-submersibles and drilling barges (not expressly shown).

Drilling system 100 may also include drill string 103 associated with drill bit 101 that may be used to form a wide variety of wellbores or bore holes such as generally vertical wellbore 114a or generally horizontal 114b wellbore or any other angle, curvature, or inclination. Various directional drilling techniques and associated components of bottom hole assembly (BHA) 120 of drill string 103 may be used to form horizontal wellbore 114b. For example, lateral forces may be applied to BHA 120 proximate kickoff location 113 to form generally horizontal wellbore 114b extending from generally vertical wellbore 114a. The term "directional drilling" may be used to describe drilling a wellbore or portions of a wellbore that extend at a desired angle or angles relative to vertical. The desired angles may be greater than normal variations associated with vertical wellbores. Direction drilling may also be described as drilling a wellbore deviated from vertical. The term "horizontal drilling" may be used to include drilling in a direction approximately ninety degrees (90°) from vertical but may generally refer to any wellbore not drilled only vertically. "Uphole" may be used to refer to a portion of wellbore 114 that is closer to well surface 106 via the path of the wellbore 114. "Downhole" may be used to refer to a portion of wellbore 114 that is further from well surface 106 via the path of the wellbore 114.

Wellbore 114 may be defined in part by casing string 110 that may extend from well surface 106 to a selected downhole location. Portions of wellbore 114, as shown in FIG. 1, that do not include casing string 110 may be described as "open hole." Various types of drilling fluid may be pumped from well surface 106 through drill string 103 to attached drill bit 101. The drilling fluids may be directed to flow from drill string 103 to respective nozzles passing through rotary drill bit 101. The drilling fluid may be circulated back to well surface 106 through annulus 108 defined in part by outside diameter 112 of drill string 103 and inside diameter 118 of wellbore 114. Inside diameter 118 may be referred to as the "sidewall" of wellbore 114. Annulus 108 may also be defined by outside diameter 112 of drill string 103 and inside diameter 111 of casing string 110. Open hole annulus 116 may be defined as sidewall 118 and outside diameter 112.

BHA 120 may be formed from a wide variety of components configured to form wellbore 114. For example, components 122a, and 122b of BHA 120 may include, but are not limited to, drill bits (e.g., drill bit 101), coring bits, drill collars, rotary steering tools, directional drilling tools, downhole drilling motors, reamers, hole enlargers or stabilizers. The number and types of components 122 included in BHA 120 may depend on anticipated downhole drilling conditions and the type of wellbore that will be formed by drill string 103 and rotary drill bit 101. BHA 120 may also include various types of well logging tools and other downhole tools associated with directional drilling of a wellbore. Examples of logging tools and/or directional drilling tools may include, but are not limited to, acoustic, neutron, gamma ray, density, photoelectric, nuclear magnetic resonance, induction, resistivity, caliper, coring, seismic, rotary steering and/or any other commercially available well tools. Further, BHA 120 may also include a rotary drive (not expressly shown) connected to components 122a, and 122b and which rotates at least part of drill string 103 together with components 122a, and 122b.

In the illustrated embodiment, logging tool 130 may be integrated with BHA 120 near drill bit 101 (e.g., within a drilling collar, for example a thick-walled tubular that provides weight and rigidity to aid in the drilling process, or a mandrel). In certain embodiments, drilling system 100 may include control unit 134, positioned at the surface, in drill string 103 (e.g., in BHA 120 and/or as part of logging tool 130) or both (e.g., a portion of the processing may occur downhole and a portion may occur at the surface). Control unit 134 may include a control system or a control algorithm for logging tool 130. Control unit 134 may be communicatively coupled to logging tool 130 and, in one or more embodiments, may be a component of logging tool 130. In certain embodiments, a control system, an algorithm, or a set of machine-readable instructions may cause control unit 134 to generate and transmit an input signal to one or more elements of logging tool 130. The input signal may be a drive signal (e.g., a signal used to generate the acoustic signal) or a braking signal (e.g., a signal used to dampen the vibration of logging tool 130). For example, control unit 134 may generate a braking signal for logging tool 130 based on the estimated vibration of logging tool 130, as discussed in more detail with reference to FIG. 4.

Logging tool 130 may be integrated into drilling system 100 at any point along the drill string 103. Logging tool 130 may include receivers (e.g., antennas) and/or acoustic transmitters capable of receiving and/or transmitting one or more acoustic signals. Logging tool 130 may further include one or more amplifiers to amplify a signal to the acoustic transmitters. The acoustic signals may facilitate recording measurements to determine the properties of the subterranean formation, including the type of rock and/or liquid (e.g., water, gas, or oil) in the formation. The acoustic transmitter may include any type of transmitter suitable for generating an acoustic signal, such as a solenoid or piezoelectric shaker. In other example embodiments, the acoustic transmitter may be pneumatic or hydraulic. In the case of a pneumatic acoustic transmitter or a hydraulic acoustic transmitter, the acoustic transmitter may include one or more cylinders or pistons and may be actuated by one or more valves. In some embodiments, logging tool 130 may include a transceiver array that functions as both an acoustic transmitter and a receiver. A drive signal may be transmitted by control unit 134 to logging tool 130 to cause logging tool 130 to emit an acoustic signal. In certain example embodiments, the control unit 134 is located in (or at least partially within) logging tool 130 and provides a drive signal to the acoustic transmitter within the logging tool 130. As the bit extends wellbore 114 through the formations, logging tool 130 may collect measurements relating to various formation properties as well as the tool orientation and position and various other drilling conditions. In some embodiments, logging tool 130 may include sensors to record measurements of an output signal of logging tool 130, such as the voltage of the logging tool or a voltage of a portion of the logging tool, such as the acoustic transmitter or the amplifier. The output signal of the logging tool 130 may be used to estimate the vibration of logging tool 130. In other example embodiments, the output signal may be measured at a component of the logging tool 130, such as the acoustic transmitter.

Telemetry sub 132 may be included on drill string 103 to transfer the measurements to surface receiver 136 and/or to receive commands from control unit 134 (when control unit 134 is at least partially located on the surface). Telemetry sub 132 may transmit downhole data to a surface receiver 30 and/or receive commands from the surface receiver 30. Telemetry sub 132 may transmit data through one or more wired or wireless communications channels (e.g., wired pipe or electromagnetic propagation). Alternatively, telemetry sub 132 may transmit data as a series of pressure pulses or modulations within a flow of drilling fluid (e.g., mud-pulse or mud-siren telemetry), or as a series of acoustic pulses that propagate to the surface through a medium, such as the drill string. Drilling system 100 may also include facilities (not expressly shown) that include computing equipment configured to collect, process, and/or store the measurements received from receivers on logging tool 130 and/or surface receiver 136. The facilities may be located onsite at the wellbore or offsite at a location away from the wellbore.

Control unit 134 may transmit an input signal (e.g., a drive signal) to logging tool 130 that causes one or more acoustic transmitters of logging tool 130 to generate an acoustic signal. The input signal may be any suitable type of signal that causes the one or more acoustic transmitters of logging tool 130 to generate an acoustic signal, such as a voltage, a current, a pressure, or a fluid volume. The acoustic signal may propagate through the subterranean formation to at least one receiver, such as surface receiver 136, one or more receivers in the logging tool 130, or one or more receivers located elsewhere on the drillstring. The receiver may record the elapsed time between when the acoustic signal is emitted by logging tool 130 and when the acoustic signal is received by the receiver. The elapsed time may be used to calculate the speed of the acoustic signal through the subterranean formation, which may be compared to known values for the speed of sounds through various types of rocks and fluid to determine the properties of the subterranean formation.

When logging tool 130 emits an acoustic signal, the acoustic transmitter of the logging tool 130 may be excited and may vibrate or oscillate longer than is desired due to a residual vibration in the acoustic transmitter. In some embodiments, the residual vibration is cause, at least in part, by other portions of the logging tool 130. The frequency of the vibrations may be within the frequency range of the acoustic signal and may reduce the quality of the acoustic signal or may result in a longer operating period of logging tool 130 and may reduce the accuracy of measurements used to determine the properties of the subterranean formation. To reduce the impact of the vibrations, control unit 134 may include a vibration control system (shown in more detail in FIG. 3) to dampen the vibrations of one or more components of logging tool 130, including the acoustic transmitter. The vibration of logging tool 130 may continue after the drive signal causes logging tool 130 to emit an acoustic signal and may continue to affect the measurements of the subterranean formation. To dampen the residual vibration, the vibration control system may provide a braking signal to one or more portions of the logging tool 130. In one example embodiment, the braking signal is provided to the acoustic transmitter from the vibration control system to dampen the residual vibration in the acoustic transmitter. Depending on the nature of the acoustic transmitter, the braking signal may be a current, a voltage, a pressure, or a fluid volume provided to the acoustic transmitter to dampen the vibration of the acoustic transmitter of the logging tool 130.

The vibration control system may record an output signal of logging tool 130 or an output signal of a portion of the logging tool 130, such as the acoustic transmitter. The output signal may have three components: an input component generated by the input signal transmitted by control unit 134 to logging tool 130; a vibration component generated by the vibration of one or more components of logging tool 130, such as the transmitter; and a residual component generated by the transient response of components of logging tool 130 immediately after the input signal changes. The three components may depend on the characteristics and working conditions of logging tool 130.

When the input signal is not zero, the total output signal of logging tool 130 may not be accurately recorded because the input component may be large compared to the other components of the output signal and may prevent the measurement of the other components. Therefore, in certain example embodiments, the output signal is observed after the drive signal and braking signal (if any) have been transmitted to the to the logging tool 130, so that the output signal may contain only the component generated by the vibration of logging tool 130.

The vibration component of the output signal of logging tool 130 may depend on the type of acoustic transmitter used by logging tool 130 to generate the acoustic signal. For example, if logging tool 130 uses an electromagnetic mechanism to generate the acoustic signal, the vibration component may be generated by the relative motion between a coil and a permanent magnet in logging tool 130. This may be referred to as the "back-EMF signal." As another example, if logging tool 130 uses a piezoelectric mechanism to generate the acoustic signal, the vibration component may be generated by the varying pressure on the piezoelectric mechanism. In another example embodiment where the logging tool 130 uses a pneumatic or hydraulic mechanism to generate the acoustic signal, the vibration component may be generated by a varying pressure on one or more pistons, cylinder, or valves.

The residual component of the output signal of logging tool 130 may be generated by coil induction, capacitors in logging tool 130, and/or other suitable components in logging tool 130. There may be other components of the output signal in addition to the input component, the vibration component, and the residual component, but the other components may be minor and may not have a significant effect on the output signal. As an example, when the vibration component is generated by the relative motion between a coil and a permanent magnet in logging tool 130, the output signal may be measured by, while input voltage is suppressed and the transient signals have dissipated, recording the back electromotive force (EMF) signal.

Once the listening period has elapsed and the output signal of logging tool 130 is recorded, the vibration control system may estimate the vibration of logging tool 130 based on the recorded output signal. The vibration control system may estimate the amplitude, phase, frequency, and decay rate of the vibrations of logging tool 130. In other example embodiments, the vibration control system may estimate the vibration of the acoustic transmitter of the logging tool 130 based, for example, and an output signal of the acoustic transmitter. The vibration control system may estimate the amplitude, phase, frequency, and decay rate of the vibrations of the acoustic transmitter of logging tool 130

Drilling system 100 may also include rotary drill bit ("drill bit") 101. Drill bit 101 may include one or more blades 126 that may be disposed outwardly from exterior portions of rotary bit body 124 of drill bit 101. Blades 126 may be any suitable type of projections extending outwardly from rotary bit body 124. Drill bit 101 may rotate with respect to bit rotational axis 104 in a direction defined by directional arrow 105. Blades 126 may include one or more cutting elements 128 disposed outwardly from exterior portions of each blade 126. Blades 126 may also include one or more depth of cut controllers (not expressly shown) configured to control the depth of cut of cutting elements 128. Blades 126 may further include one or more gage pads (not expressly shown) disposed on blades 126. Drill bit 101 may be designed and formed in accordance with teachings of the present disclosure and may have many different designs, configurations, and/or dimensions according to the particular application of drill bit 101.

At various times during the drilling process, drill string 103 may be removed from wellbore 114 and a wellbore logging tool may be used to obtain information about the subterranean formation. FIG. 2 illustrates an elevation view of an example embodiment of drilling system 200 used in an illustrative logging environment with the drill string removed, in accordance with some embodiments of the present disclosure. Subterranean operations may be conducted using wireline system 220 once the drill string has been removed, though, at times, some or all of the drill string may remain in wellbore 114 during logging with wireline system 220. Wireline system 220 may include one or more logging tools 226 that may be suspended in wellbore 216 by conveyance 215 (e.g., a cable, slickline, or coiled tubing). Logging tool 226 may be similar to logging tool 130, as described with reference to FIG. 1. Logging tool 226 may be communicatively coupled to conveyance 215. Conveyance 215 may contain conductors for transporting power to wireline system 220 and telemetry from logging tool 226 to logging facility 244. Alternatively, conveyance 215 may lack a conductor, as is often the case using slickline or coiled tubing, and wireline system 220 may contain a control unit similar to control unit 134, shown in FIG. 1, that contains memory, one or more batteries, and/or one or more processors for performing operations and storing measurements. In certain embodiments, system 200 may include control unit 234, positioned at the surface, in the wellbore (e.g., in conveyance 215 and/or as part of logging tool 226) or both (e.g., a portion of the processing may occur downhole and a portion may occur at the surface). Control unit 234 may include a control system or a control algorithm for logging tool 226. Control unit 234 may be communicatively coupled to logging tool 226 and, in one or more embodiments, may be a component of logging tool 226. In certain embodiments, a control system, an algorithm, or a set of machine-readable instructions may cause control unit 234 to generate and provide an input signal to one or more elements of logging tool 226, such as an amplifier or an acoustic transmitter. The input signal may be a drive signal (e.g., a signal used to generate the acoustic signal) or a braking signal (e.g., a signal used to dampen the vibration of logging tool 226 or a portion of logging tool 226, such as an acoustic transmitter). Logging facility 244 (shown in FIG. 2 as a truck, although it may be any other structure) may collect measurements from logging tool 226, and may include computing facilities for controlling, processing, or storing the measurements gathered by logging tool 226. The computing facilities may be communicatively coupled to logging tool 226 by way of conveyance 215 and may operate similarly to control unit 134 and/or surface receiver 136, as shown in FIG. 1. In certain example embodiments, control unit 234, which may be located in logging tool 226, may perform one or more functions of the computing facility. An example of a computing facility is described with more detail with reference to FIG. 3.

As described with respect to logging tool 130 in FIG. 1, one or more portions of logging tool 226 may vibrate, or ring, after emitting an acoustic signal during a subterranean operation. In certain example embodiments, the acoustic transmitter of logging tool 226 may vibrate, or ring, after emitting an acoustic signal during a subterranean operation. The ringing may be in the frequency range of the acoustic signal emitted by the acoustic transmitter of the logging tool. In certain embodiments this ringing decreases the quality of the acoustic signal. The decrease in signal quality may increase the logging time or may result in higher energy requirements for logging tool 226. Therefore, it may be advantageous to reduce the ringing of one or more components of logging tool 226, as discussed in further detail with respect to FIG. 4. For example, a system or method may dampen the ringing of the acoustic transmitter of logging tool 226 and may improve the quality of the acoustic signal. One method for dampening the ringing of the acoustic transmitter of logging tool 226 may be through the use of a vibration control system. A vibration control system, which may be included in the computing facilities of logging facility 244, control unit 234, or a component of logging tool 226, may include a listening period, after an input signal is transmitted to logging tool 226, to record the output signal of logging tool 226. The input signal may be a drive signal (e.g., a signal used to generate the acoustic signal) or a braking signal (e.g., a signal used to dampen the vibration of the acoustic transmitter of logging tool 226). As such, systems and methods designed according to the present disclosure may enable more accurate and more efficient measurements of the subterranean formation.

Figure 3:
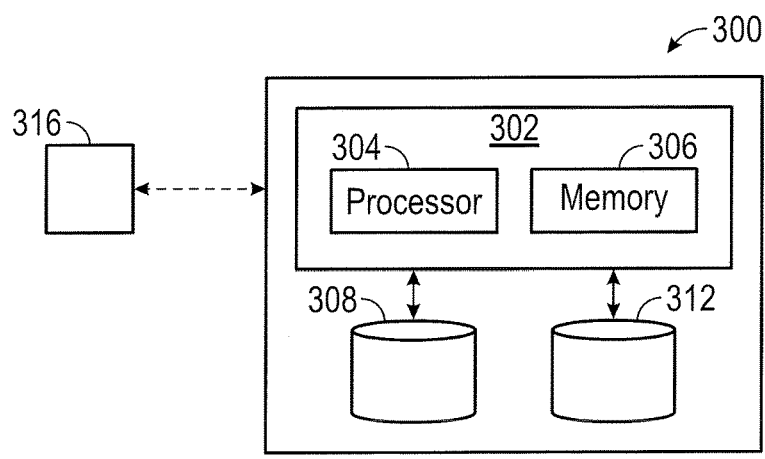
FIG. 3 illustrates a block diagram of an exemplary vibration control system for a wellbore logging tool, in accordance with some embodiments of the present disclosure.

FIG. 3 illustrates a block diagram of an exemplary control unit 300 for a logging tool, in accordance with some embodiments of the present disclosure. Control unit 300 may be configured to provide an input signal to and perform vibration control for a wellbore logging tool, such as logging tool 130 or logging tool 226. In certain example embodiments control until 300 may be configured to provide an input signal to an acoustic transmitter or to an amplifier in a wellbore logging tool. In some embodiments, control unit 300 may include vibration control system 302. Vibration control system 302 may be used to perform the steps of method 400 as described with respect to FIGS. 4-7. Vibration control system 302 may include any suitable components. For example, in some embodiments, vibration control system 302 may include processor 304. Processor 304 may include, for example a microprocessor, microcontroller, digital signal processor (DSP), application specific integrated circuit (ASIC), or any other digital or analog circuitry configured to interpret and/or execute program instructions and/or process data. In some embodiments, processor 304 may be communicatively coupled to memory 306. Processor 304 may be configured to interpret and/or execute program instructions and/or data stored in memory 306. Program instructions or data may constitute portions of software for carrying out the design of a vibration control system for a wellbore logging tool, as described herein. Memory 306 may include any system, device, or apparatus configured to hold and/or house one or more memory modules; for example, memory 306 may include read-only memory, random access memory, solid state memory, or disk-based memory. Each memory module may include any system, device or apparatus configured to retain program instructions and/or data for a period of time (e.g., computer-readable non-transitory media).

Control unit 300 may further include vibration estimation database 312. Vibration estimation database 312 may be communicatively coupled to vibration control system 302 and may provide vibration estimation parameters for a logging tool in response to a query or call by vibration control system 302. Vibration estimation database 312 may be implemented in any suitable manner, such as by functions, instructions, logic, or code, and may be stored in, for example, a relational database, file, application programming interface, library, shared library, record, data structure, service, software-as-service, or any other suitable mechanism. Vibration estimation database 312 may include code for controlling its operation such as functions, instructions, or logic. Vibration estimation database 312 may specify any suitable properties of the logging tool that may be used for estimating the vibration of the logging tool or a portion of the logging tool (e.g., the acoustic transmitter), such as the acceleration, speed, and energy consumption rate of the logging tool. Although control unit 300 is illustrated as including two databases, control unit 300 may contain any suitable number of databases.

In some embodiments, vibration control system 302 may be configured to generate signals for vibration control for a wellbore logging tool. In some embodiments, vibration control system 302 may be configured to generate signals for vibration control for the acoustic transmitter of the wellbore logging tool. For example, vibration control system 302 may be configured to import one or more instances of braking signal database 308, and/or one or more instances of vibration estimation database 312. Values from braking signal database 308, and/or vibration estimation database 312 may be stored in memory 306. Vibration control system 302 may be further configured to cause processor 304 to execute program instructions operable to generate signals for vibration control for a wellbore logging tool. For example, processor 304 may, based on values in braking signal database 308 and vibration estimation database 312, monitor the vibration of a logging tool as a result of vibration created in the logging tool during and after which the logging tool generates an acoustic signal and may iteratively update a braking signal for the logging tool to dampen the vibration, as discussed in further detail with reference to FIG. 4.

Control unit 300 may be communicatively coupled to one or more displays 316 such that information processed by vibration control system 302 (e.g., input signals for the logging tool) may be conveyed to operators of drilling and logging equipment at the wellsite or may be displayed at a location offsite.

Modifications, additions, or omissions may be made to FIG. 3 without departing from the scope of the present disclosure. For example, FIG. 3 shows a particular configuration of components for control unit 300. However, any suitable configurations of components may be used. For example, components of control unit 300 may be implemented either as physical or logical components. Furthermore, in some embodiments, functionality associated with components of control unit 300 may be implemented in special purpose circuits or components. In other embodiments, functionality associated with components of control unit 300 may be implemented in a general purpose circuit or components of a general purpose circuit. For example, components of control unit 300 may be implemented by computer program instructions. Control unit 300 or components thereof can be located at the surface, downhole (e.g., in the BHA and/or in the logging tool), or some combination of both locations (e.g., certain components could be disposed at the surface and certain components could be disposed downhole, where the surface components are communicatively coupled to the downhole components).

FIG. 3 illustrates a block diagram of an exemplary vibration control system 300 for a logging tool, in accordance with some embodiments of the present disclosure. Vibration control system 300 may be configured to perform vibration control for a wellbore logging tool, such as logging tool 130 or logging tool 226. Vibration control system 300 may be used to perform the steps of method 400 as described with respect to FIG. 8. In some embodiments, vibration control system 300 may include vibration control module 302. Vibration control module 302 may include any suitable components. For example, in some embodiments, vibration control module 302 may include processor 304. Processor 304 may include, for example a microprocessor, microcontroller, digital signal processor (DSP), application specific integrated circuit (ASIC), or any other digital or analog circuitry configured to interpret and/or execute program instructions and/or process data. In some embodiments, processor 304 may be communicatively coupled to memory 306. Processor 304 may be configured to interpret and/or execute program instructions and/or data stored in memory 306. Program instructions or data may constitute portions of software for carrying out the design of a vibration control system for a wellbore logging tool, as described herein. Memory 306 may include any system, device, or apparatus configured to hold and/or house one or more memory modules; for example, memory 306 may include read-only memory, random access memory, solid state memory, or disk-based memory. Each memory module may include any system, device or apparatus configured to retain program instructions and/or data for a period of time (e.g., computer-readable non-transitory media).

Vibration control system 300 may further include braking signal database 308. Braking signal database 308 may be communicatively coupled to vibration control module 302 and may provide values that may be used to generate a braking signal in response to a query or call by vibration control module 302. Braking signal database 308 may be implemented in any suitable manner, such as by functions, instructions, logic, or code, and may be stored in, for example, a relational database, file, application programming interface, library, shared library, record, data structure, service, software-as-service, or any other suitable mechanism. Braking signal database 308 may include code for controlling its operation such as functions, instructions, or logic. Braking signal database 308 may specify any suitable parameters that may be used to generate a braking signal to reduce the vibration of a logging tool, such as amplitude and phase of the vibration.

Vibration control system 300 may further include vibration estimation database 312. Vibration estimation database 312 may be communicatively coupled to vibration control module 302 and may provide vibration estimation parameters for a logging tool in response to a query or call by vibration control module 302. Vibration estimation database 312 may be implemented in any suitable manner, such as by functions, instructions, logic, or code, and may be stored in, for example, a relational database, file, application programming interface, library, shared library, record, data structure, service, software-as-service, or any other suitable mechanism. Vibration estimation database 312 may include code for controlling its operation such as functions, instructions, or logic. Vibration estimation database 312 may specify any suitable properties of the logging tool that may be used for estimating the vibration of the logging tool, such as the acceleration, speed, and energy consumption rate of the logging tool. Although vibration control system 300 is illustrated as including two databases, vibration control system 300 may contain any suitable number of databases.

In some embodiments, vibration control module 302 may be configured to generate signals for vibration control for a wellbore logging tool. For example, vibration control module 302 may be configured to import one or more instances of braking signal database 308, and/or one or more instances of vibration estimation database 312. Values from braking signal database 308, and/or vibration estimation database 312 may be stored in memory 306. Vibration control module 302 may be further configured to cause processor 304 to execute program instructions operable to generate signals for vibration control for a wellbore logging tool. For example, processor 304 may, based on values in braking signal database 308 and vibration estimation database 312, monitor the vibration of a logging tool as a result of vibration created in the logging tool during and after which the logging tool generates an acoustic signal and may determine a braking signal for the logging tool to dampen the vibration, as discussed in further detail with reference to FIG. 8.

Vibration control module 302 may be communicatively coupled to one or more displays 316 such that information processed by vibration control module 302 (e.g., input signals for the logging tool) may be conveyed to operators of drilling and logging equipment at the wellsite or may be displayed at a location offsite.

Modifications, additions, or omissions may be made to FIG. 3 without departing from the scope of the present disclosure. For example, FIG. 3 shows a particular configuration of components for vibration control system 300. However, any suitable configurations of components may be used. For example, components of vibration control system 300 may be implemented either as physical or logical components. Furthermore, in some embodiments, functionality associated with components of vibration control system 300 may be implemented in special purpose circuits or components. In other embodiments, functionality associated with components of vibration control system 300 may be implemented in a general purpose circuit or components of a general purpose circuit. For example, components of vibration control system 300 may be implemented by computer program instructions. Vibration control system or components thereof can be located at the surface, downhole (e.g. in the BHA and/or in the logging tool), or some of both (e.g. certain components could be disposed at the surface and certain components could be disposed downhole, wherein the surface components are communicatively coupled to the downhole components).

The vibration of a logging tool, such as logging tool 130 as shown in FIG. 1 or logging tool 226 as shown in FIG. 2, may be described as a oscillating system with a behavior that may be described as a function of one or more of amplitude, frequency, phase, decay rate. In certain example embodiments, one or more of amplitude, frequency, phase, decay rate are scalars. The vibration of a component of the logging tool 130, such as the acoustic transmitter of logging tool 130 as shown in FIG. 1 or logging tool 226 as shown in FIG. 2, may also be described as a oscillating system with a behavior that may be described as a function of one or more of amplitude, frequency, phase, and decay rate. In other example embodiments, one or more of amplitude, frequency, phase, decay rate are vectors. In still other embodiments, the vibration of logging tool or the vibration of components of the wellbore logging tool, such as the acoustic transmitter, may further be a function of one or more non-linear terms. These non-linear terms may include, for example, one or more natural frequencies of the logging tool, one or more natural frequencies of the acoustic transmitter, and one or more natural frequencies of other components of the wellbore logging tool. Other non-linear terms may include, in the case of logging tool 130, one or more natural frequencies of the drill string. Still other non-linear terms may include, in the case of the logging tool 226, one or more natural frequencies of the conveyance 215. Other non-linear terms include natural frequencies of the borehole. Vibration control may be provided in by an online active acoustic dampening system to producing a braking signal to dampen the ringing in the acoustic transmitter of the wellbore logging tool. In certain example embodiments, the vibration control system 302 causes the acoustic transmitter of the logging tool to output an active dampening braking signal after the drive signal, so that vibration in the acoustic transmitter is dampened. In certain example embodiments, the active dampening braking signal is updated in real time. In some example embodiments, the active dampening braking signal may be updated for each sampling interval. In other example embodiments, the active dampening braking signal is updated periodically. In some example embodiments, the active dampening braking signal is a function of measured or estimated vibration of the acoustic transmitter or measured or estimated vibration of other portions of the wellbore logging tool. The measured or estimated vibration may be in the form of one or more of position, velocity, or acceleration. In certain embodiments, the active dampening braking signal is based on one or more of temperature and pressure at, for example, the wellbore logging tool location. In certain example embodiments, the active dampening braking signal may be described by the following equation:

$$u(k+1)=f(y(k),y(k-1),y(k-2),u(k),T(k+1),P(k+1)) \quad \text{(Eq.1)}$$

where: k is the present discrete sampling step number for the current firing round (assume k=0 at the beginning of each sonic firing); u(k) is the braking control command value at step k; y(k) is a measured or estimated transmitter vibration output, which may be one or more of a position, a velocity, or an acceleration; y(k−1) is the vibration output at the previous discrete step; T is the temperature; and P is the pressure. Certain example embodiments may omit one or more of the foregoing terms. For example, where pressure and temperature are not available, example embodiments may still generate the active dampening braking signal without those inputs.

Figure 4:
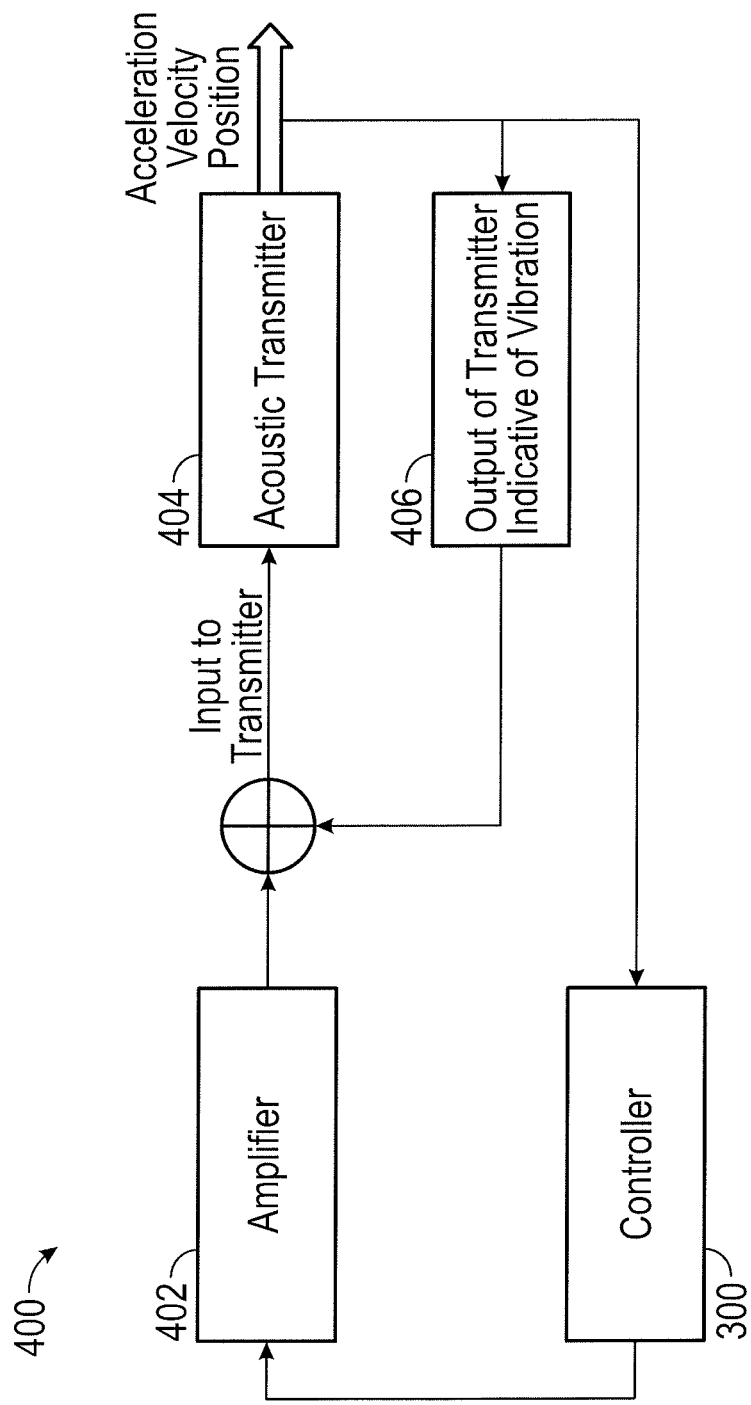
FIGS. 4-7 illustrate functional block diagram of wellbore logging systems with active vibration dampening, in accordance with some embodiments of the preset disclosure.

FIG. 4 is a functional block diagram of an example wellbore logging system 400 with active vibration dampening. Controller 300 receives an input from a sensor that is indicative of one or more of acceleration, velocity, or position of the wellbore logging tool. In this example system 400, the controller 300 has direct feedback indicating vibration of the wellbore logging tool. The controller 300 is able to transmit a signal to amplifier 402 which, in turn, sends an amplified signal to acoustic transmitter 404. The signal from the controller 300 may be any suitable type of signal including, for example, a voltage, a current, or a pressure signal. In turn, the signal from the amplifier 402 may be any suitable signal for input to the acoustic transmitter 404, including for example a voltage, a current, or a pressure signal.

The controller 300 may provide a drive signal to cause the acoustic transmitter 404 to generate an acoustic signal. The acoustic signal may be used to calculate the properties of a subterranean formation by recording the travel time of the acoustic signal through the formation. The acoustic signal may propagate through the formation to at least one receiver. The receiver may record the elapsed time between when the acoustic signal is emitted by the logging tool and when the acoustic signal is received by the receiver and the elapsed time may be used to calculate the speed of the acoustic signal through the subterranean formation. The speed of sound through various types of rocks and fluid are known and the elapsed time may be compared to the known values to determine the properties of the formation. When the acoustic transmitter 404 generates an acoustic signal, it may cause the logging tool to vibrate at a frequency in the range of the desired acoustic signal. The vibration may result in lower quality data, may increase the time required to perform the logging, and may require more energy input into the logging tool. The acoustic transmitter 404 has an output that is indicative of a vibration in the wellbore logging tool. Where the acoustic transmitter 404 is an electromagnetic acoustic transmitter, the output of the transmitter that is indicative of the vibration 406 may include a back electromagnetic (EMF) voltage. Where the acoustic transmitter 404 is a piezoelectric acoustic transmitter, the output of the transmitter that is indicative of the vibration 406 may include a current that is induced in the piezoelectric material by the force of the vibration. Where the acoustic transmitter 404 is a hydraulic or a pneumatic acoustic transmitter, the output of the transmitter that is indicative of the vibration 406 may include a pressure in one or more pistons, cylinder, or valves of the acoustic transmitter 404. The output of the transmitter that is indicative of the vibration 406 may alter the input to the transmitter from amplifier 402.

To reduce the vibration in the acoustic transmitter 404, the controller generates an active dampening braking signal which is then input to amplifier 402. The mathematical description of the active dampening braking signal can be written as:

$$u(k+1)=K_p(T,P)y(k)+K_i(T,P)\Sigma_{i=0}^{k}y(i)+K_d(T,P)(y(k)-y(k-1)) \quad \text{(Eq.2)}$$

Alternatively, the active dampening braking signal can be written as:

$$u(k+1)=a_1(T,P)y(k)+a_2(T,P)y(k-1)+a_3(T,P)y(k-2)+a_4(T,P)y(k-3)+\ldots a_n(T,P)y(k-n)-b_1(T,P)u(k)-b_2(T,P)u(k-1)-\ldots b_m(T,P)u(k-m) \quad \text{(Eq. 3)}$$

In this form, the active dampening braking signal can be characterized as $n^{th}$ order parameter varying dynamic controller. In certain example embodiments, the parameter varying coefficients (e.g., $a_1, \ldots a_n, b_1, \ldots b_n$) are designed using frequency shaping methods. In other example embodiment the parameter varying coefficients (e.g., $a_1, \ldots a_n, b_1, \ldots b_n$) are determined by H-infinity based (or induced $L_2$ norm based) robust control design methods.

Figure 5:
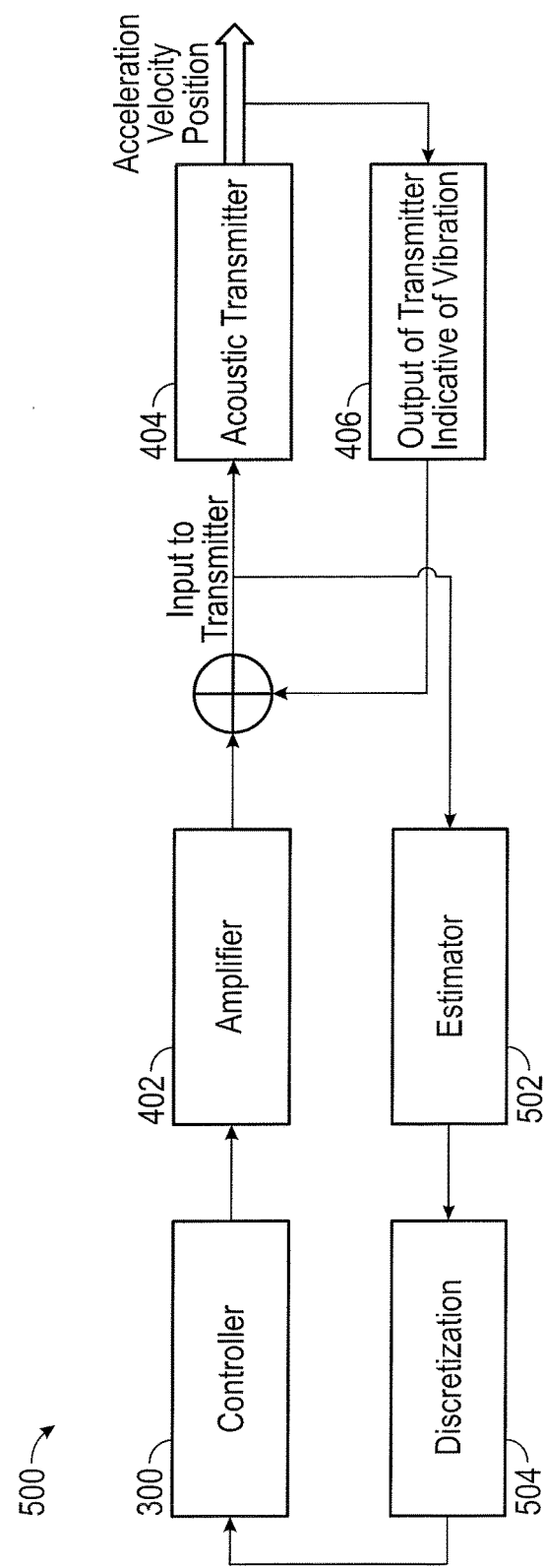

FIG. 5 is a functional block diagram of an example wellbore logging system 500 with active vibration dampening. In the case of wellbore logging system 500, a measurement of the vibration of the acoustic transmitter 404 (e.g., acceleration, vibration, or position) is not available to the controller 300. In the case depicted in FIG. 5, the input to the signal to the acoustic transmitter 404 is designated by a voltage signal V, and the acceleration of the wellbore logging tool is by the system 500 estimated with the voltage measurement as the input to the estimator. The estimator 502 could be a function g in the general form as:

$$\hat{y}(k)=g(\hat{y}(k-1),\hat{y}(k-2),\ldots \hat{y}(k-m),V(k),V(k-1),\ldots,V(k-n)) \quad \text{(Eq. 4)}$$

where ŷ(k) is the estimated acceleration at sampling step k, ŷ(k−1) is the estimation as previous sampling instance, and V is the measured voltage signal. Although Eq. 4 is written in terms of a voltage signal, similar functions are possible for other input signal types, such as input current signals or input pressure signals. In general, as shown in FIG. 5, the value of the signal input to the wellbore logging transmitter 404 is measured by estimator 502, which provides an estimate based, for example, on Equation 4 to discretization unit 504. The output of discretization unit 504, which is a measure of the vibration (e.g., acceleration, vibration, or position), is input to controller 300. Using this system, the active dampening braking signal is determined based on the current input to the acoustic transmitter 404.

Figure 6:
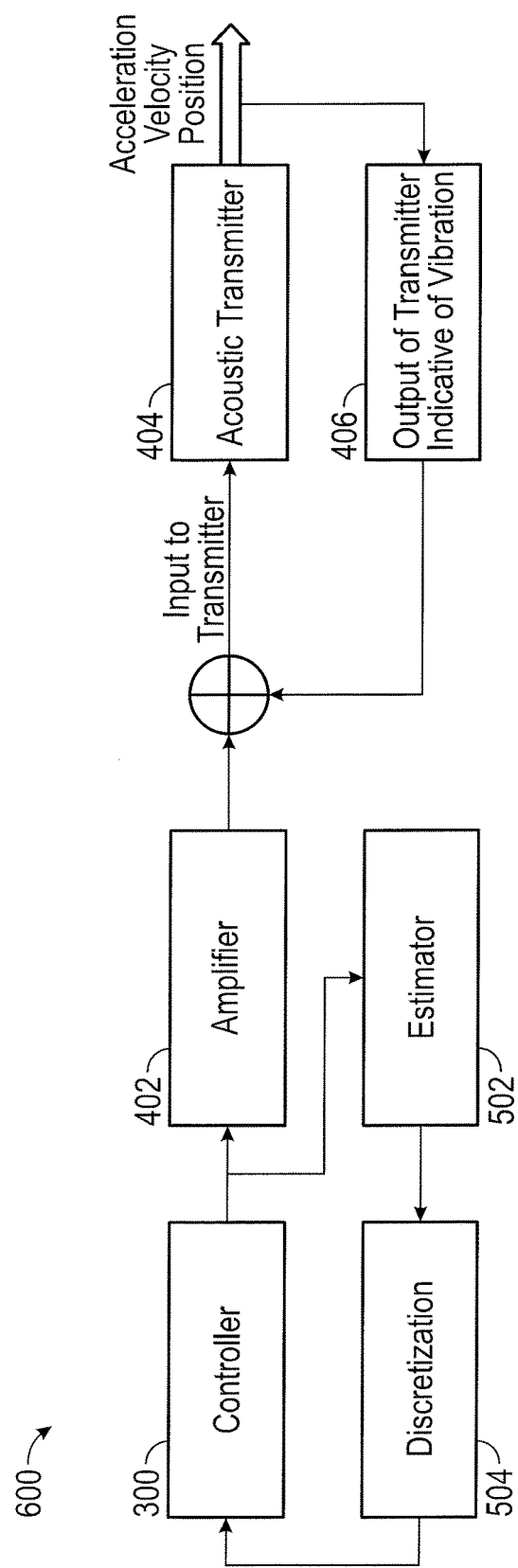

FIG. 6 is a functional block diagram of an example wellbore logging system 600 with active vibration dampening where the input signal to the wellbore logging transmitter 404 cannot be measured in real-time. In the case of wellbore logging system 600 the vibration of the acoustic transmitter 404 is estimated from one or more past values of the input signal to acoustic transmitter 404. These past input signal are measured by estimator 502. The output of the estimator is input to the discretization element 504, which provides the discretized estimates of vibration to controller 300. In one example embodiment, the output of estimator 502 may be described by the following equation:

$$\hat{y}(k)=g(\hat{y}(k-1),\hat{y}(k-2),\ldots \hat{y}(k-m),u(k),u(k-1),\ldots,u(k-n)) \quad \text{(Eq. 5)}$$

Based on this input to controller 300, the active dampening braking signal can be determined by incorporating Equations (4) and (5) into Equations (2) and (3), yielding the following equations.

$$u(k+1)=K_p(T,P)\hat{y}(k)+K_i(T,P)\Sigma_{i=0}^{k}\hat{y}(i)+K_d(T,P)(\hat{y}(k)-\hat{y}(k-1)) \quad \text{(Ex. 6)}$$

Or $$u(k+1)=a_1(T,P)\hat{y}(k)+a_2(T,P)\hat{y}(k-1)+a_3(T,P)\hat{y}(k-2)+a_4(T,P)\hat{y}(k-3)+\ldots a_n(T,P)\hat{y}(k-n)-b_1(T,P)u(k)-b_2(T,P)u(k-1)-\ldots b_m(T,P)u(k-m) \quad \text{(Ex. 7)}$$

In certain example embodiments, the transmitter damping coefficient and natural frequency vary with temperature and pressure. Both the temperature and the pressure vary in the operating environment of the acoustic transmitter 404 in the borehole. In certain example embodiments, the controller 300 updates one or more estimator coefficients in the above equations (e.g., in Equations 4 and 5 above) based on temperature and pressure measurements from the wellbore logging tool. In one example embodiment, the controller 300 queries an calibrated look-up table for the coefficients for function g in Equations 4, 5 at different temperatures T and pressures P as: g(T, P) before real-time operations begin and caches those results, so that the parameter values can be obtained on-line based on measured environmental temperature and pressure during real-time operations.

In another example embodiment, the estimator coefficients are determined based on the active damping results from the past firing cycles. In one example embodiment, a residual vibration $E_{s-1}$ could be detected from the measured portion of the output of the acoustic transmitter 404 that is indicative of the vibration 406 for firing cycle s−1, where s indicates a firing cycle rather than a sampling step. If $E_{s-1}$ is larger than certain threshold, then the controller may update the estimator coefficients for the next firing cycle s based on the following function:

$$g_s=g_{s-1}+L_g(g_{s-1},g_{s-2},E_{s-1},E_{s-2},\text{step}_g) \quad \text{(Eq. 8)}$$

where $L_g$ is the adaptation law with the inputs of residual vibration error E, adaptation step $\text{step}_g$ and the estimator coefficients used in previous cycles; and $\text{step}_g$ is the adaptation increments for each step.

Figure 7:
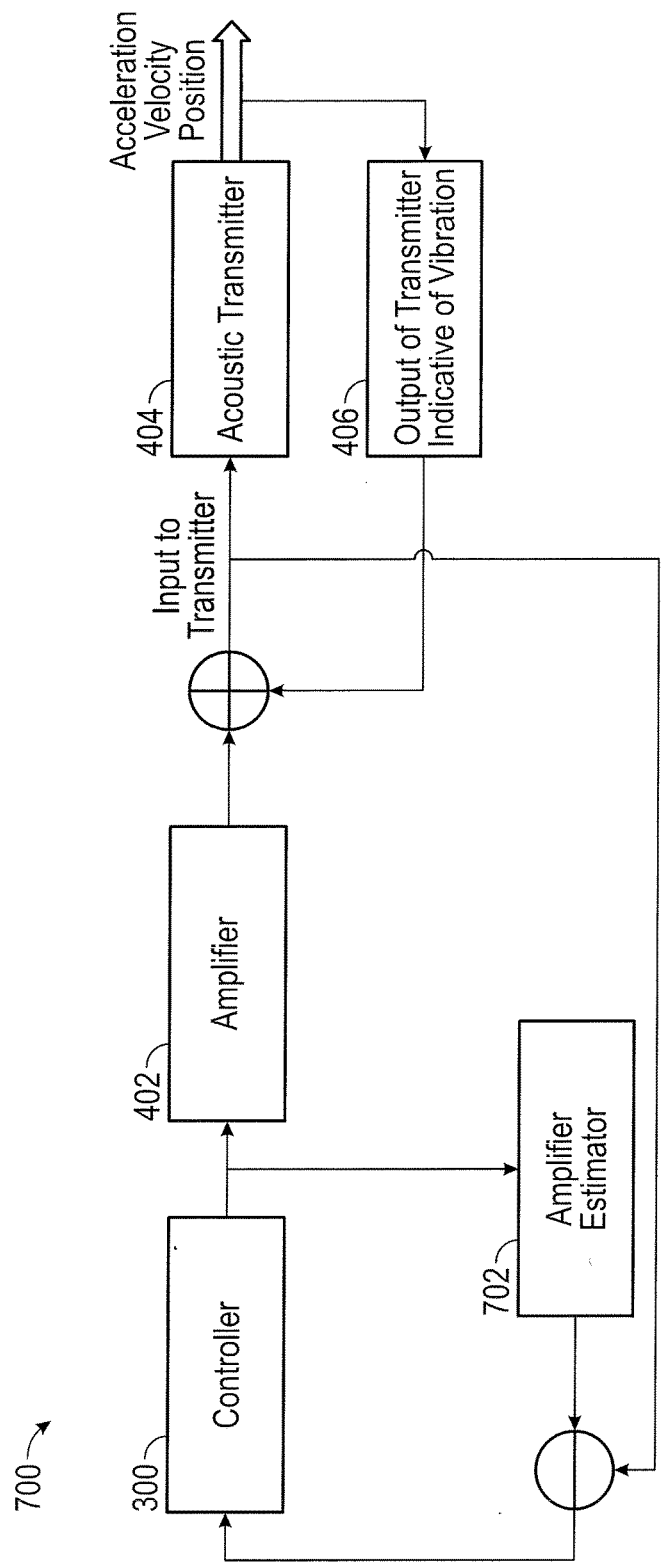

FIG. 7 is a functional block diagram of an example wellbore logging system 600 with active vibration dampening that decouples the output of the transmitter that indicative of vibration 406 from the input to the acoustic transmitter 404. In the case of an electromagnetic acoustic transmitter, the back EMF signal is decoupled from the input to the electromagnetic acoustic transmitter. There is physical relationship between the back EMF (back electromagnetic feedback voltage) voltage signal $V_{EMF}$ and the vibration speed of the acoustic transmitter 404 (Speed) as:

$$V_{EMF} = BL \times \text{Speed} \tag{Eq.9}$$

where B is magnetic field constant and L is the projected length of the electrical circuit. In certain embodiments, the transmitter vibration acceleration also correlates with the back EMF voltage $V_{EMF}$. The relationship could be expressed in the following equation:

$$y_{Acc} = \frac{d\left(\frac{V_{EMF}}{BL}\right)}{dt} \tag{Eq. 10}$$

In general, the relationship between acceleration and the back EMF voltage signal may be expressed as function S:

$$y_{Acc} = S(V_{EMF}) \tag{Eq.11}$$

In certain example embodiment, an acceleration of the acoustic transmitter 404 ($y_{Acc}$) is estimated from back EMF voltage. In general, however, the back EMF voltage signal cannot be measured because it is coupled with amplifier output as shown in FIG. 7. In one example embodiment, the back EMF voltage is measured by decoupling the back EMF voltage from the amplifier output. In one example embodiment, the input signal to the acoustic transmitter 404 is measured, and the amplifier output voltage is estimated from the control input u and the amplifier dynamic model as:

$$\text{Output}_{Amplifier} = \text{Amplifier\_Model}(u) \tag{Eq. 12}$$

The back EMF can then be estimated by following equation:

$$V_{EMF} = \text{Voltage}_{measured} - \text{Output}_{Amplifier} \tag{Eq.13}$$

where $\text{Voltage}_{measured}$ is the measured voltage as shown in FIG. 7, and $\text{Output}_{Amplifier}$ is the estimated amplifier output voltage. With Equation 13, the acceleration could be estimated from Equations 10 or 11, and the feedback control could be formed as one or more of Equations 1, 2, or 3. The system of FIG. 7 therefore includes amplifier estimator 702 to estimate the value of the signal output from the amplifier 402. The measured signal into the acoustic transmitter 404 is subtracted from the output of amplifier estimator 702 and the resulting signal is input to controller 300. Other example embodiments for decoupling the portion of the output signal that is indicative of vibration 406 estimate a current or a pressure.

Figure 8:
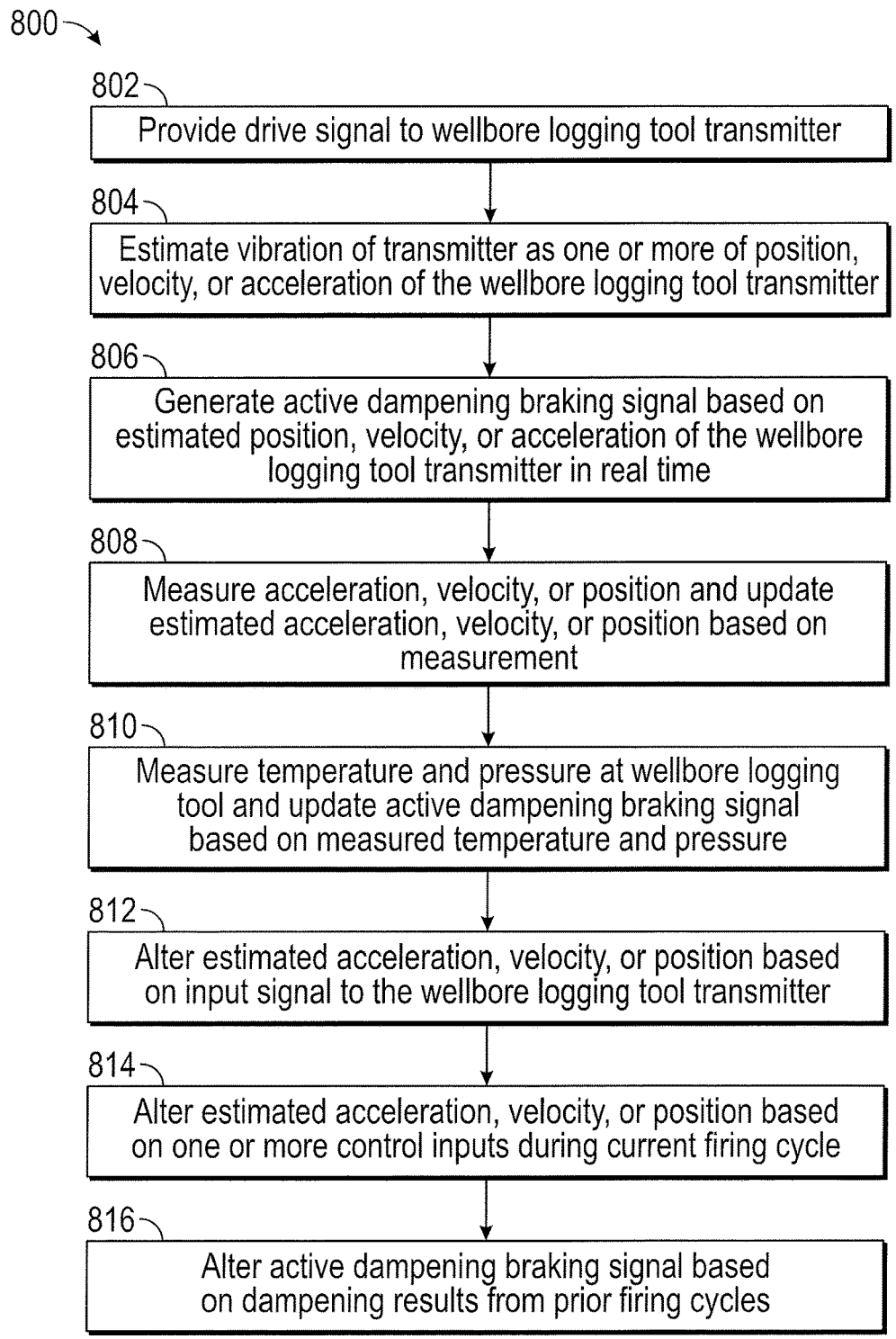
FIG. 8 illustrates a flow chart of a method of vibration control for a wellbore logging tool, in accordance with some embodiments of the present disclosure.

FIG. 8 illustrates a flow chart of a method 800 for vibration control of a wellbore logging tool, in accordance with some embodiments of the present disclosure. The steps of method 800 may be performed by various computer programs, models, or any combination thereof, configured to simulate and design drilling systems, apparatuses and devices, such as the vibration control system illustrated in FIG. 3. For illustrative purposes, method 800 is described with respect to the drilling or logging system as illustrated in the previous FIGURES; however, method 800 may be used to provide vibration control for any logging tool in any drilling or logging system.

Method 800 may begin at step 802 where the vibration control system may provide a drive signal to the acoustic transmitter 404 which may cause the acoustic transmitter 404 to generate an acoustic signal. The acoustic signal may be used to calculate the properties of a subterranean formation by recording the travel time of the acoustic signal through the formation. The acoustic signal may propagate through the formation to at least one receiver. The receiver may record the elapsed time between when the acoustic signal is emitted by the logging tool and when the acoustic signal is received by the receiver and the elapsed time may be used to calculate the speed of the acoustic signal through the subterranean formation. The speed of sound through various types of rocks and fluid are known and the elapsed time may be compared to the known values to determine the properties of the formation. When the logging tool generates an acoustic signal, it may cause the logging tool to vibrate at a frequency in the range of the desired acoustic signal. The vibration may result in lower quality data, may increase the time required to perform the logging, and may require more energy input into the logging tool.

At step 804, the controller 300 estimates a present vibration in the acoustic transmitter 404. The vibration may be estimated as one or more of acceleration, a velocity, or a position of the wellbore logging tool. Based on the vibration estimated, at step 806 the controller 300 generates an active dampening braking signal based on the estimated vibration of the acoustic transmitter 404. In certain example embodiments, the active dampening braking signal is generated in real time. That is, for each sampling interval, the generated active dampening braking signal is updated based on the then-estimated vibration.

At step 808, the controller 300 measures one or more of an actual acceleration, an actual velocity, or an actual position of the acoustic transmitter 404 or other elements of the wellbore logging tool. In certain example embodiments, this measurement is based on the output of one or more accelerometers located at or near the acoustic transmitter 404. Based on these measurements, the controller 300 may update the previously updated estimates of the vibration of the acoustic transmitter 404. In certain example embodiments, such as that described with respect to FIG. 4, the controller 300 may update the active dampening braking signal based on the measured vibration of the acoustic transmitter 404 or the measured vibration of one or more other portions of the wellbore logging tool.

At step 810, the controller 300 may measure one or more operating conditions, such as one or more of a temperature and a pressure at the wellbore logging device. In certain embodiments, the active dampening braking signal is updated based on the measured temperature and pressure.

As described above with respect to FIG. 5, in certain embodiment the controller 300 may determine a present input signal to a wellbore logging transmitter. At step 812, the controller 300 alters the estimated acceleration, velocity, or position based on the measured input signal to the wellbore logging transmitter.

At step 814, the controller 300 alters the estimated acceleration, velocity, or position based on one or more control inputs to the controller 300 during the current filing cycle. At step 816, the controller alters the active dampening braking signal based on dampening results from prior firing cycles.

Modifications, additions, or omissions may be made to method 800 without departing from the scope of the present disclosure. For example, the order of the steps may be performed in a different manner than that described and some steps may be performed at the same time. Additionally, each individual step may include additional steps without departing from the scope of the present disclosure.

Figure 9:
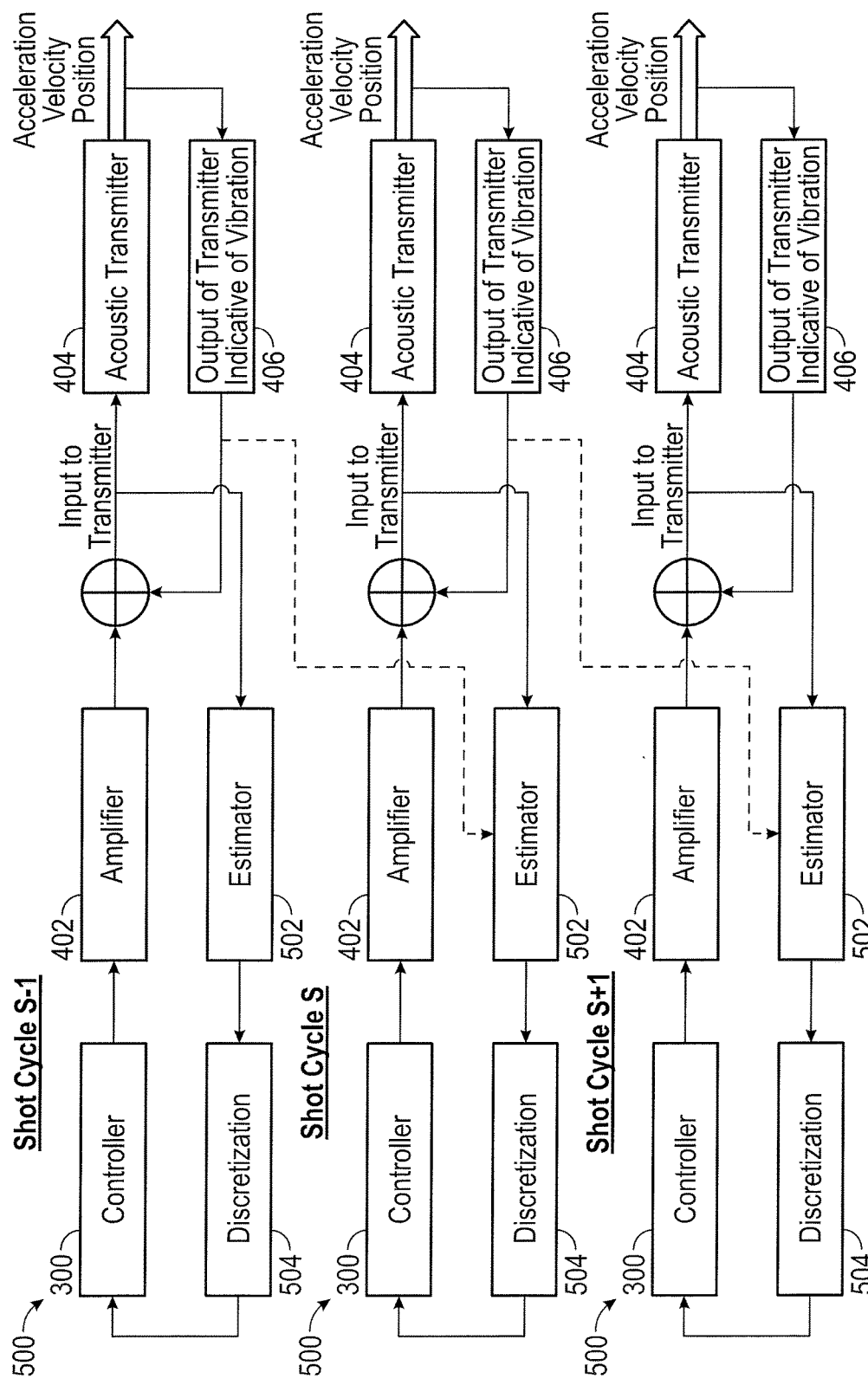
FIG. 9 illustrate a series of functional block diagrams of wellbore logging systems active vibration dampening implementing an example method of FIG. 8, in accordance with some embodiments of the preset disclosure

FIG. 9 illustrates a series of functional block diagrams of the example wellbore logging system 500 with active vibration dampening altering the active dampening braking signal based on dampening results from prior firing cycles. In the case of FIG. 9, the shot cycles are shot cycle S−1, shot cycle S, and shot cycle S+1. As shown in FIG. 9, the output of the wellbore logging transmitter that is indicative of a vibration 406 from shot cycle S−1 is used to update the estimator 502 used in shot cycle S. Likewise, the output of the wellbore logging transmitter that is indicative of a vibration 406 from shot cycle S is used to update the estimator 502 for shot cycle S+1. In other example embodiments, other measures of vibrations associated with prior cycles are used to alter the active dampening braking signal. In certain example embodiments, accelerometer measurements for prior shot cycles are used to update the active dampening braking signal.

Figure 10A:
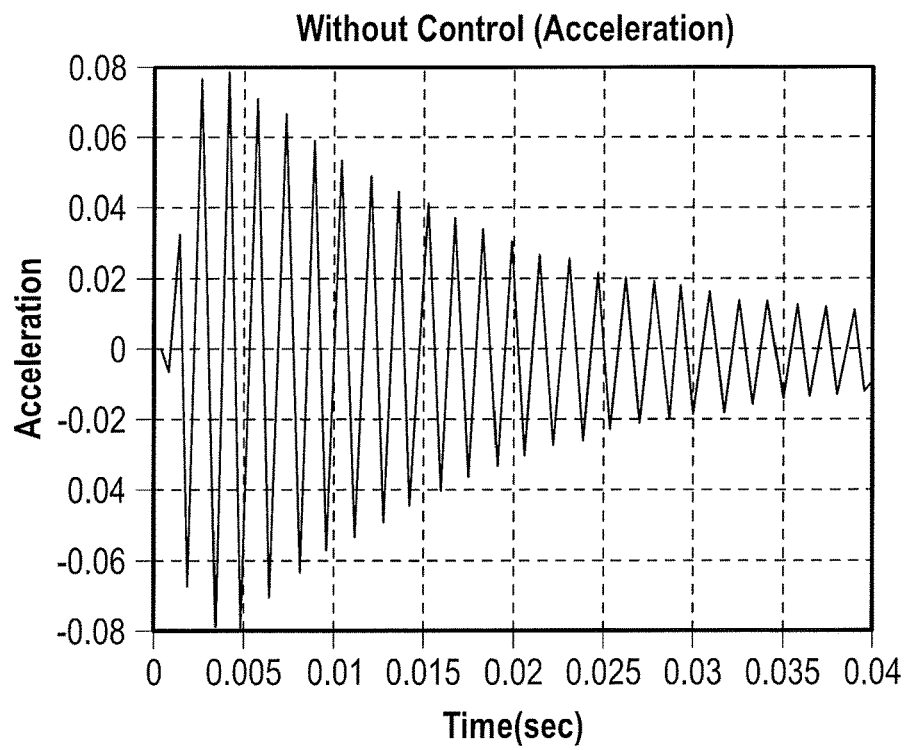
FIGS. 10A and 10B illustrate the results from an exemplary embodiment of the method shown in FIG. 8, in accordance with some embodiments of the present disclosure.
Figure 10B:
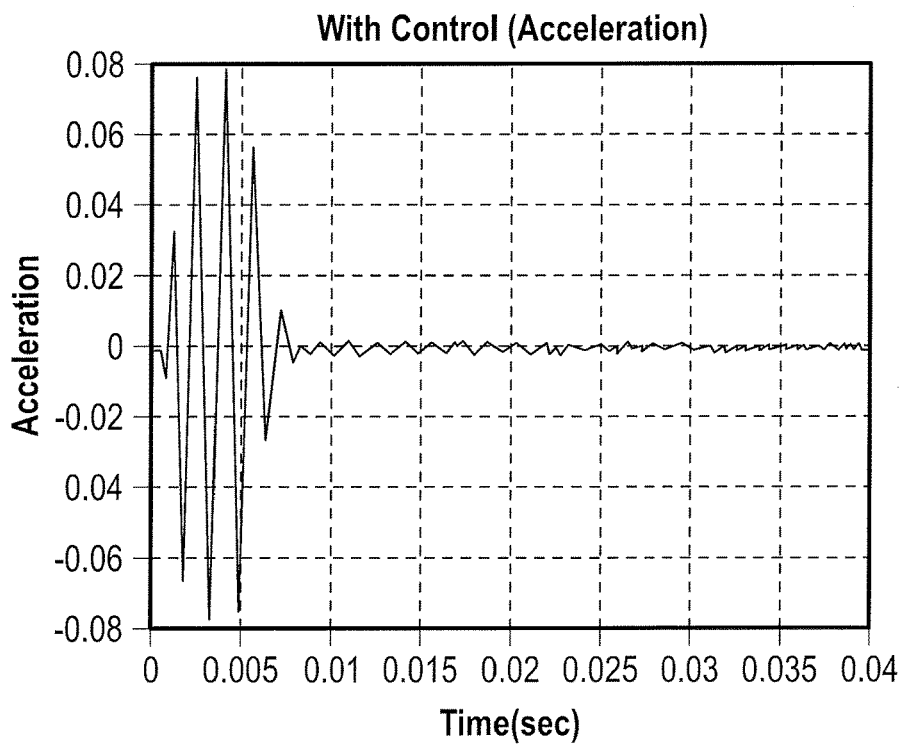

FIGS. 10A and 10B illustrate the results from an exemplary embodiment of the method shown in FIG. 8, in accordance with some embodiments of the present disclosure. A simulation was performed comparing a logging tool without any damping control to a logging tool using the damping control method described with respect to FIG. 8. FIG. 9A illustrates a vibration signal (as acceleration versus time) observed in an acoustic transmitter of a wellbore logging tool where active dampening braking was not used. FIG. 9B illustrates a vibration signal (as acceleration versus time) in an acoustic transmitter of a wellbore logging tool where active dampening braking according to the method of FIG. 8 was employed.

In one embodiment, a method of vibration control for a wellbore logging tool may include estimating one or more of an estimated position, an estimated velocity, and an estimated acceleration of the acoustic transmitter after a drive signal has been provided to the acoustic transmitter and generating an active dampening braking signal based, at least in part, on one or more of the estimated position, the estimated velocity, and the estimated acceleration of the acoustic transmitter. The wellbore logging tool may include an acoustic transmitter.

In certain aspects of the disclosed method, the method may further include measuring one or more of a measured position, a measured velocity, and a measured acceleration of the acoustic transmitter using a sensor and updating one or more of the estimated position, the estimated velocity, and the estimated acceleration of the wellbore logging tool based on one or more of the measured position, the measured velocity, and the measured acceleration of the acoustic transmitter.

In certain aspects of the disclosed method, the method may further include measuring one or both of a temperature and a pressure at the wellbore logging tool; and wherein estimating the estimated position, the estimated velocity, or the estimated acceleration of the wellbore logging tool is based on one or both of the temperature and the pressure at the wellbore logging tool.

In one or more of the previously described aspects of the disclosed method, estimating one or more of the estimated position, the estimated velocity, and the estimated acceleration of the acoustic transmitter may further include estimating one or more of the estimated position, the estimated velocity, and the estimated acceleration of the acoustic transmitter based, at least in part, on prior active dampening braking signals, wherein the prior active dampening braking signals correspond to prior firing cycles.

In one or more of the previously described aspects of the disclosed method, the acoustic transmitter may include an electromagnetic acoustic transmitter. Estimating one or more of the estimated position, the estimated velocity, and the estimated acceleration of the acoustic transmitter tool further may further include estimating one or more of the estimated position, the estimated velocity, and the estimated acceleration of the acoustic transmitter based, at least in part, a present voltage applied to the electromagnetic transmitter.

In one or more of the previously described aspects of the disclosed method, the acoustic transmitter may include a piezoelectric acoustic transmitter. Estimating one or more of the estimated position, the estimated velocity, and the estimated acceleration of the acoustic transmitter may further include estimating one or more of the estimated position, the estimated velocity, and the estimated acceleration of the acoustic transmitter based, at least in part, a present current applied to the piezoelectric transmitter.

In one or more of the previously described aspects of the disclosed method, the acoustic transmitter may include a hydraulic or a pneumatic acoustic transmitter. Estimating one or more of the estimated position, the estimated velocity, and the estimated acceleration of the acoustic transmitter may further include estimating one or more of the estimated position, the estimated velocity, and the estimated acceleration of the acoustic transmitter based, at least in part, a present pressure applied to the hydraulic or pneumatic transmitter.

In one or more of the previously described aspects of the disclosed method, estimating one or more of the estimated position, the estimated velocity, and the estimated acceleration of the acoustic transmitter, may further include estimating one or more of the estimated position, the estimated velocity, and the estimated acceleration of the acoustic transmitter based, at least in part, on one or more past values for the input signal to the acoustic transmitter during the current firing cycle.

In one or more of the previously described aspects of the disclosed method, the method may further include decoupling an output from the acoustic transmitter that is indicative of the present vibration in the acoustic transmitter. Estimating one or more of the estimated position, the estimated velocity, and the estimated acceleration of the acoustic transmitter may further be based, at least in part, on the decoupled output from the acoustic transmitter that is indicative of the present vibration in the acoustic transmitter.

In one or more of the previously described aspects of the disclosed method, the acoustic transmitter may include an electromagnetic acoustic transmitter. Decoupling an output from the wellbore logging tool that is indicative of the present vibration in the wellbore logging tool may include decoupling a back electromotive force voltage from the electromagnetic acoustic transmitter.

In one or more of the previously described aspects of the disclosed method, the active dampening braking signal may be updated in real time.

In one embodiment, a wellbore logging system for logging a wellbore may include a conveyance, a wellbore logging tool connected to the conveyance and suspended in the wellbore, wherein the wellbore logging tool comprises an acoustic transmitter, and a vibration control system communicatively coupled to the wellbore logging tool. The vibration control system may include a processor and a memory communicatively coupled to the processor. The memory may include non-transitory machine readable instruction, that, when executed, may cause the processor to estimate one or more of an estimated position, an estimated velocity, and an estimated acceleration of the acoustic transmitter after the drive signal has been provided to the acoustic transmitter and generate an active dampening braking signal based, at least in part, on one or more of the estimated position, the estimated velocity, and the estimated acceleration of the acoustic transmitter.

In certain aspects of the disclosed wellbore logging system, the wellbore logging system may further include at least one sensor to measure one or more of a measured position, a measured velocity, and a measured acceleration of the acoustic transmitter. The executable instructions may further cause the processor to update one or more of the estimated position, the estimated velocity, and the estimated acceleration of the wellbore logging tool based on one or more of the measured position, the measured velocity, and the measured acceleration of the acoustic transmitter.

In certain aspects of the disclosed wellbore logging system, the wellbore logging system may further include at least one sensor to measure one or both of a temperature and a pressure at the wellbore logging tool. The executable instructions may further cause the processor to estimate the estimated position, the estimated velocity, or the estimated acceleration of the acoustic transmitter based on one or both of the temperature and the pressure at the wellbore logging tool.

In certain aspects of the disclosed wellbore logging system, the wellbore logging system may further include In one or more of the previously described aspects of the disclosed wellbore logging system, the executable instructions may further cause the processor to estimate one or more of the estimated position, the estimated velocity, and the estimated acceleration of the acoustic transmitter based, at least in part, on prior active dampening braking signals, corresponding to prior firing cycles.

In one or more of the previously described aspects of the disclosed wellbore logging system, the acoustic transmitter may include an electromagnetic acoustic transmitter. The executable instructions may further cause the processor to alter one or more of the estimated position, the estimated velocity, and the estimated acceleration of the acoustic transmitter based, at least in part, a voltage applied to the electromagnetic transmitter.

In one or more of the previously described aspects of the disclosed wellbore logging system, the wellbore logging tool may include a piezoelectric acoustic transmitter. The executable instructions may further cause the processor to estimate one or more of the estimated position, the estimated velocity, and the estimated acceleration of the acoustic transmitter based, at least in part, a current applied to the piezoelectric transmitter.

In one or more of the previously described aspects of the disclosed wellbore logging system, the wellbore logging tool may include a hydraulic or a pneumatic acoustic transmitter. The executable instructions may further cause the processor to estimate one or more of the estimated position, the estimated velocity, and the estimated acceleration of the acoustic transmitter based, at least in part, a pressure applied to the hydraulic or pneumatic transmitter.

In one or more of the previously described aspects of the disclosed wellbore logging system, the executable instructions may further cause the processor to estimate one or more of the estimated position, the estimated velocity, and the estimated acceleration of the acoustic transmitter based, at least in part, on one or more past control inputs for the current firing cycle.

In one or more of the previously described aspects of the disclosed wellbore logging system, the executable instructions may further cause the processor to decouple a present vibration in the acoustic transmitter and estimate one or more of the estimated position, the estimated velocity, and the estimated acceleration of acoustic transmitter further based, at least in part, on the present vibration in acoustic transmitter.

In one or more of the previously described aspects of the disclosed wellbore logging system, the acoustic transmitter may include an electromagnetic acoustic transmitter. The executable instructions may further cause the processor to decouple a back electromotive force (EMF) voltage from the electromagnetic acoustic transmitter.

In one or more of the previously described aspects of the disclosed wellbore logging system, the active dampening braking signal may be updated in real time.

What is claimed is:

1. A method of vibration control for a wellbore logging tool, wherein the wellbore logging tool comprises an acoustic transmitter, the method comprising:
    estimating, by a vibration control system, one or more of an estimated position, an estimated velocity, and an estimated acceleration of the acoustic transmitter after a drive signal has been provided to the acoustic transmitter based, at least in part, on one or more vibration estimation parameters, wherein the one or more vibration estimation parameters comprise at least one of acceleration, speed and energy consumption rate of the wellbore logging tool; and
    generating, by the vibration control system, an active dampening braking signal based, at least in part, on one or more of the estimated position, the estimated velocity, and the estimated acceleration of the acoustic transmitter, and providing the active dampening braking signal to the acoustic transmitter, wherein the active dampening braking signal dampens residual vibration in the acoustic transmitter.

2. The method of claim 1, further comprising:
    measuring one or more of a measured position, a measured velocity, and a measured acceleration of the acoustic transmitter using a sensor; and
    updating one or more of the estimated position, the estimated velocity, and the estimated acceleration of the wellbore logging tool based on one or more of the measured position, the measured velocity, and the measured acceleration of the acoustic transmitter.

3. The method of claim 1, further comprising:
    measuring one or both of a temperature and a pressure at the wellbore logging tool; and
    wherein estimating the estimated position, the estimated velocity, or the estimated acceleration of the wellbore logging tool is based on one or both of the temperature and the pressure at the wellbore logging tool.

4. The method of claim 1, wherein estimating one or more of the estimated position, the estimated velocity, and the estimated acceleration of the acoustic transmitter further comprises:
    estimating one or more of the estimated position, the estimated velocity, and the estimated acceleration of the acoustic transmitter based, at least in part, on prior active dampening braking signals, wherein the prior active dampening braking signals correspond to prior firing cycles.

5. The method of claim 1, wherein the acoustic transmitter comprises an electromagnetic acoustic transmitter and wherein estimating one or more of the estimated position, the estimated velocity, and the estimated acceleration of the acoustic transmitter tool further comprises:

estimating one or more of the estimated position, the estimated velocity, and the estimated acceleration of the acoustic transmitter based, at least in part, a present voltage applied to the electromagnetic transmitter.

6. The method of claim 1, wherein the acoustic transmitter comprises a piezoelectric acoustic transmitter and wherein estimating one or more of the estimated position, the estimated velocity, and the estimated acceleration of the acoustic transmitter further comprises:
estimating one or more of the estimated position, the estimated velocity, and the estimated acceleration of the acoustic transmitter based, at least in part, a present current applied to the piezoelectric transmitter.

7. The method of claim 1, wherein the acoustic transmitter comprises a hydraulic or a pneumatic acoustic transmitter and wherein estimating one or more of the estimated position, the estimated velocity, and the estimated acceleration of the acoustic transmitter further comprises:
estimating one or more of the estimated position, the estimated velocity, and the estimated acceleration of the acoustic transmitter based, at least in part, a present pressure applied to the hydraulic or pneumatic transmitter.

8. The method of claim 1, wherein estimating one or more of the estimated position, the estimated velocity, and the estimated acceleration of the acoustic transmitter, further comprises:
estimating one or more of the estimated position, the estimated velocity, and the estimated acceleration of the acoustic transmitter based, at least in part, on one or more past values for the input signal to the acoustic transmitter during the current firing cycle.

9. The method of claim 1, further comprising:
decoupling an output from the acoustic transmitter that is indicative of the present vibration in the acoustic transmitter; and
wherein estimating one or more of the estimated position, the estimated velocity, and the estimated acceleration of the acoustic transmitter is further based, at least in part, on the decoupled output from the acoustic transmitter that is indicative of the present vibration in the acoustic transmitter.

10. The method of claim 9, wherein the acoustic transmitter comprises an electromagnetic acoustic transmitter and wherein decoupling an output from the wellbore logging tool that is indicative of the present vibration in the wellbore logging tool comprises:
decoupling a back electromotive force voltage from the electromagnetic acoustic transmitter.

11. The method of claim 1, wherein the active dampening braking signal is updated in real time.

12. A wellbore logging system for logging a wellbore, comprising:
a conveyance;
a wellbore logging tool connected to the conveyance and suspended in the wellbore, wherein the wellbore logging tool comprises an acoustic transmitter; and
a vibration control system communicatively coupled to the wellbore logging tool, the vibration control system including:
a processor; and
a memory communicatively coupled to the processor, the memory including non-transitory machine readable instruction, that, when executed, cause the processor to:
estimate, by a vibration control system, one or more of an estimated position, an estimated velocity, and an estimated acceleration of the acoustic transmitter after the drive signal has been provided to the acoustic transmitter based, at least in part, on one or more vibration estimation parameters, wherein the one or more vibration estimation parameters comprise at least one of acceleration, speed and energy consumption rate of the wellbore logging tool; and
generate, by the vibration control system, an active dampening braking signal based, at least in part, on one or more of the estimated position, the estimated velocity, and the estimated acceleration of the acoustic transmitter, and provide the active dampening braking signal to the acoustic transmitter, wherein the active dampening braking signal dampens residual vibration in the acoustic transmitter.

13. The wellbore logging system of claim 12, further comprising:
at least one sensor to measure one or more of a measured position, a measured velocity, and a measured acceleration of the acoustic transmitter; and
wherein the executable instructions further cause the processor to:
update one or more of the estimated position, the estimated velocity, and the estimated acceleration of the wellbore logging tool based on one or more of the measured position, the measured velocity, and the measured acceleration of the acoustic transmitter.

14. The wellbore logging system of claim 12, further comprising:
at least one sensor to measure one or both of a temperature and a pressure at the wellbore logging tool;
and wherein the executable instructions further cause the processor to:
estimate the estimated position, the estimated velocity, or the estimated acceleration of the acoustic transmitter based on one or both of the temperature and the pressure at the wellbore logging tool.

15. The wellbore logging system of claim 12, wherein the executable instructions further cause the processor to:
estimate one or more of the estimated position, the estimated velocity, and the estimated acceleration of the acoustic transmitter based, at least in part, on prior active dampening braking signals, corresponding to prior firing cycles.

16. The wellbore logging system of claim 12, wherein:
the acoustic transmitter comprises a electromagnetic acoustic transmitter; and
wherein the executable instructions further cause the processor to:
alter one or more of the estimated position, the estimated velocity, and the estimated acceleration of the acoustic transmitter based, at least in part, a voltage applied to the electromagnetic transmitter.

17. The wellbore logging system of claim 12, wherein:
the wellbore logging tool comprises a piezoelectric acoustic transmitter; and
wherein the executable instructions further cause the processor to:
estimate one or more of the estimated position, the estimated velocity, and the estimated acceleration of the acoustic transmitter based, at least in part, a current applied to the piezoelectric transmitter.

18. The wellbore logging system of claim 12, wherein:
the wellbore logging tool comprises a hydraulic or a pneumatic acoustic transmitter; and wherein the executable instructions further cause the processor to:

estimate one or more of the estimated position, the estimated velocity, and the estimated acceleration of the acoustic transmitter based, at least in part, a pressure applied to the hydraulic or pneumatic transmitter.

19. The wellbore logging system of claim 12, wherein the executable instructions further cause the processor to:
estimate one or more of the estimated position, the estimated velocity, and the estimated acceleration of the acoustic transmitter based, at least in part, on one or more past control inputs for the current firing cycle.

20. The wellbore logging system of claim 12, wherein the executable instructions further cause the processor to:
decouple a present vibration in the acoustic transmitter; and
estimate one or more of the estimated position, the estimated velocity, and the estimated acceleration of acoustic transmitter further based, at least in part, on the present vibration in acoustic transmitter.

21. The wellbore logging system of claim 20, wherein:
the acoustic transmitter comprises an electromagnetic acoustic transmitter; and
wherein the executable instructions further cause the processor to:
decouple a back electromotive force (EMF) voltage from the electromagnetic acoustic transmitter.

22. The wellbore logging system of claim 12, wherein the active dampening braking signal is updated in real time.

* * * * *